June 26, 1928.

E. P. SACREY 1,675,136

MACHINE FOR CUTTING OIL GROOVES

Filed May 1, 1924       8 Sheets-Sheet 1

June 26, 1928.

E. P. SACREY

1,675,136

MACHINE FOR CUTTING OIL GROOVES

Filed May 1, 1924

E. P. SACREY 1,675,136

MACHINE FOR CUTTING OIL GROOVES

Filed May 1, 1924

Inventor-
Elmer P. Sacrey.
by his Attorneys

June 26, 1928.

E. P. SACREY 1,675,136

MACHINE FOR CUTTING OIL GROOVES

Filed May 1, 1924    8 Sheets-Sheet 6

Inventor.—
Elmer P. Sacrey,
by his Attorneys.

June 26, 1928.

E. P. SACREY 1,675,136

MACHINE FOR CUTTING OIL GROOVES

Filed May 1, 1924

Inventor
Elmer P. Sacrey
by his Attorneys

Patented June 26, 1928.

1,675,136

UNITED STATES PATENT OFFICE.

ELMER P. SACREY, OF PHILADELPHIA, PENNSYLVANIA.

MACHINE FOR CUTTING OIL GROOVES.

Application filed May 1, 1924. Serial No. 710,395.

This invention relates to machines particularly adapted for cutting oil grooves in the inner surfaces of bearings, bushings and the like, and also for cutting grooves for key-ways and splines, and for die slotting.

The invention resides in a novel arrangement of elements affording highly efficient operation and durability.

My invention is illustrated in the attached drawings, in which:

Fig. 3 is a section on the line 3—3, Fig. 1.

With reference to the drawings, the machine comprises a main frame 1 having secured at one side a bracket arm 2, the outer end of which forms a journal 3 for a shaft 4, this shaft also having a bearing 5 secured in the said frame. The shaft 4 carries intermediate its ends a loose pulley 6 and a fast pulley 7, which latter is keyed to the shaft as indicated at 8. These pulleys are adapted to be connected by means of a suitable belt with an external source of power (not shown), and a belt shifter 10 is provided for shifting the belt from one pulley to the other.

Figures 4, 9, 10, 11, 12, 13:
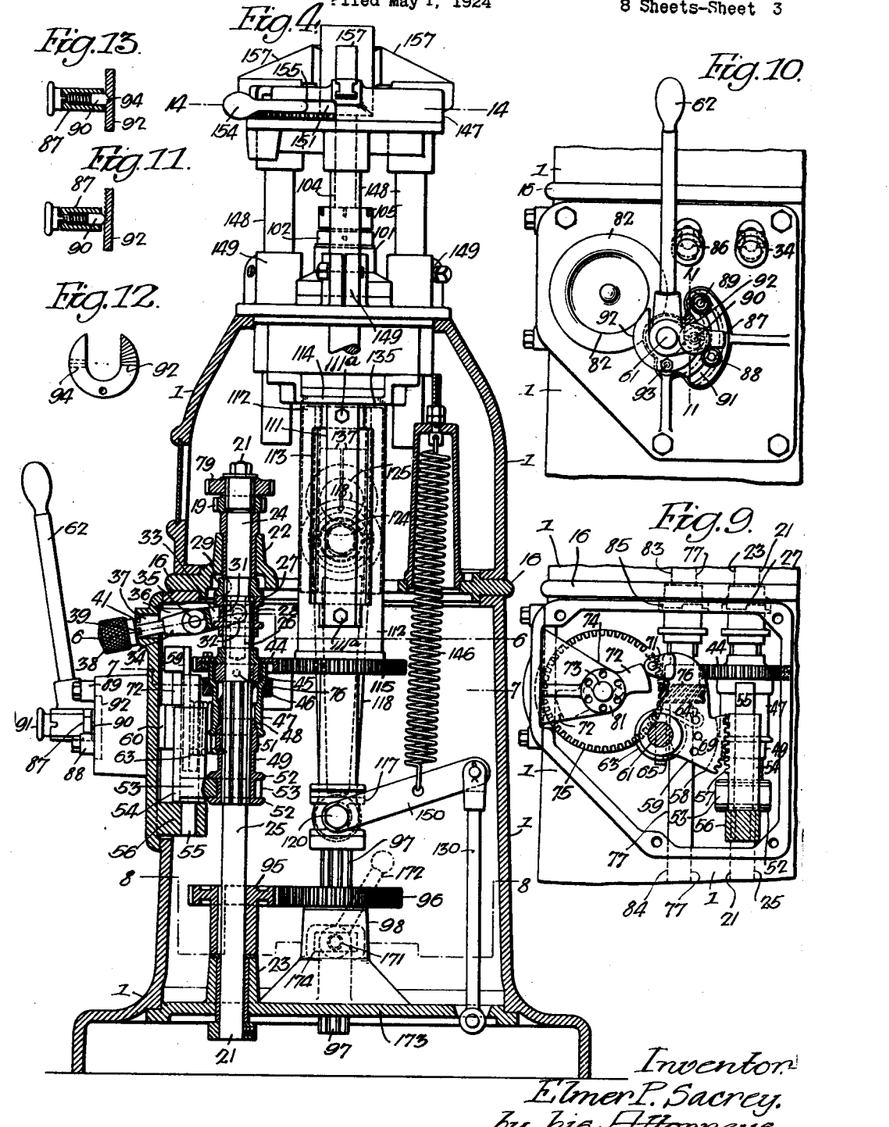
Fig. 4 is a section on the line 4—4, Fig. 1.
Fig. 9 is a fragmentary section on the line 9—9, Fig. 7.
Fig. 10 is a fragmentary elevation illustrating the operating lever and other details of the machine.
Fig. 11 is a section on the line 11—11, Fig. 10.
Fig. 12 is a face view of a detail of the invention.
Fig. 13 is a view similar to Fig. 11, showing an alternate position of the element shown in Fig. 12.
Figure 6:
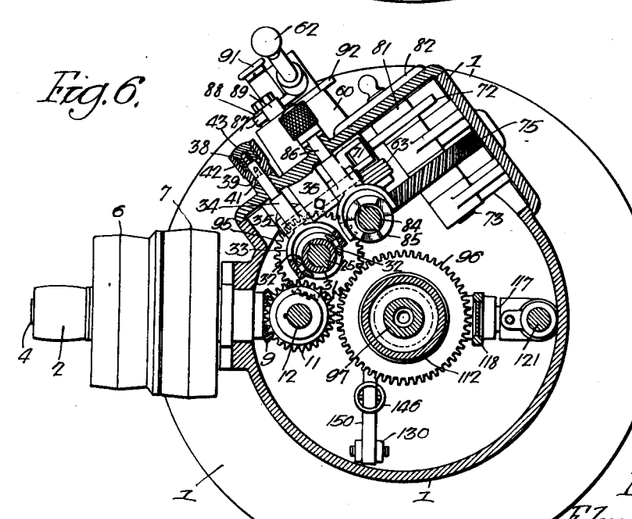
Fig. 6 is a section on the line 6—6, Fig. 4.

Secured to the inner end of the shaft 4 is a bevel pinion 9 which meshes with a second pinion 11 keyed to a vertical shaft 12 and supported on said shaft by means, in the present instance, of a set screw 13. This shaft 12 is journaled at the bottom in a bearing 14 and at the top in a bearing 15 formed in a suitable ring 16 forming part of the frame 1. A collar 17 supports the shaft at the bottom, as clearly illustrated in Fig. 3. The shaft 12 carries at the top a gear 18 which meshes with a gear 19 upon a second vertical shaft 21, which latter, as best shown in Fig. 4, is journaled at the top in a bearing 22 and at the bottom in a bearing 23. The shaft 21 is divided and comprises an upper section 24 which carries the pinion 19 and which is supported in the bearing 22, and a lower section 25 which is counterbored at the top to receive the reduced lower end 26, (see Figure 4) of the section 24. The two sections are adapted to be operatively connected by means of a clutch 27 including an element 28 splined to the shaft 21 and a second element 29 keyed to the shaft section 24. The splined element 28 comprises a circumferential recess 31, (see Figure 6) into opposite sides of which extend bearing elements 32, 32, pivotally secured to the extremities of the forked end 33 of a clutch operating lever 34, which latter is pivotally mounted upon a shaft 35 journaled at 36 in the casing. The free end of the lever 34 projects through an opening 37 in the casing 1 and is provided at its outer end with an adjustable head 38 having on its inner face teeth 39 adapted to engage in one or other of a pair of recesses 41 in the casing 1 at the edges of the opening 37. As shown in Fig. 6, the head 38 is normally held inwardly of the spindle by means of a spring 42 confined between the movable portion of the head and a nut 43 threaded on the end of the lever. This arrangement provides for the release of the teeth 39 from the recesses 41 so that the lever may be rocked from one position to another, thereby engaging or disengaging the clutch 27 at will.

Figures 7, 8, 20, 21:
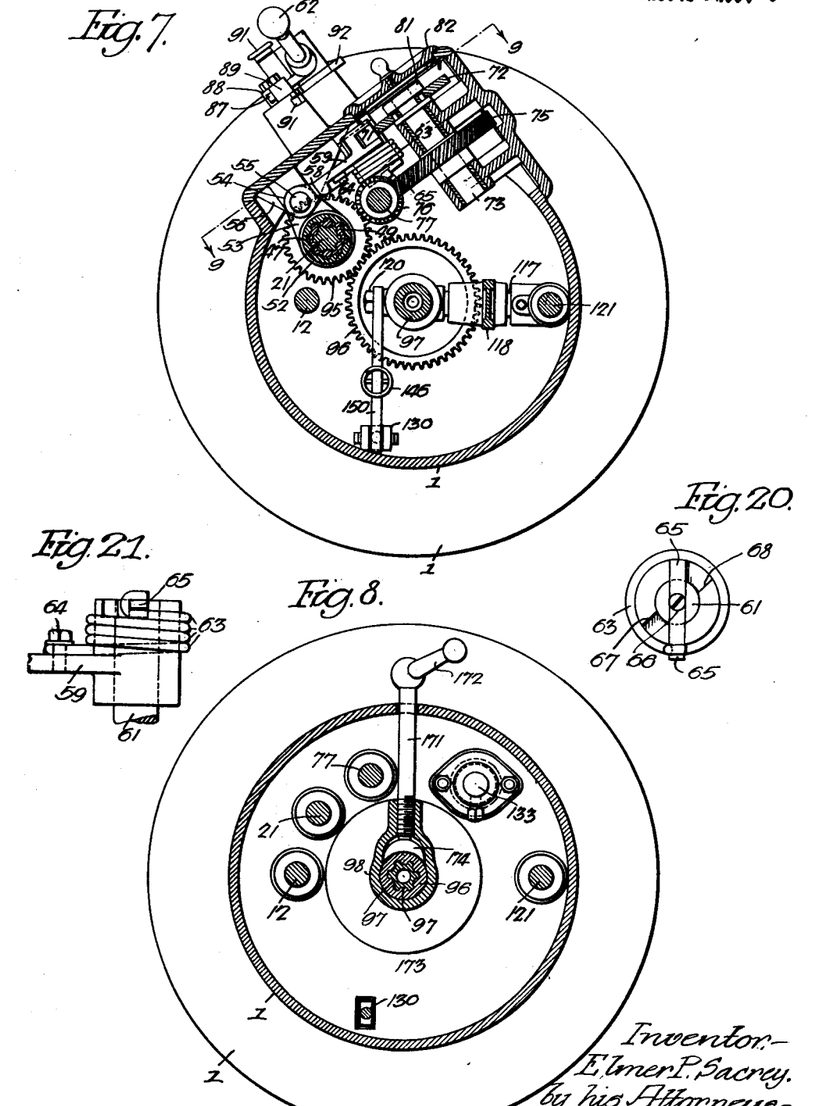
Fig. 7 is a section on the line 7—7, Fig. 4.
Fig. 8 is a section on the line 8—8, Fig. 4.
Fig. 20 is a detached elevation illustrating one of the elements of that portion of the mechanism illustrated in Fig. 9.
Fig. 21 is a fragmentary inverted plan view illustrating a further detail of this portion of the mechanism.
Figures 24, 25, 26, 27, 28, 29, 30, 31, 34, 35:
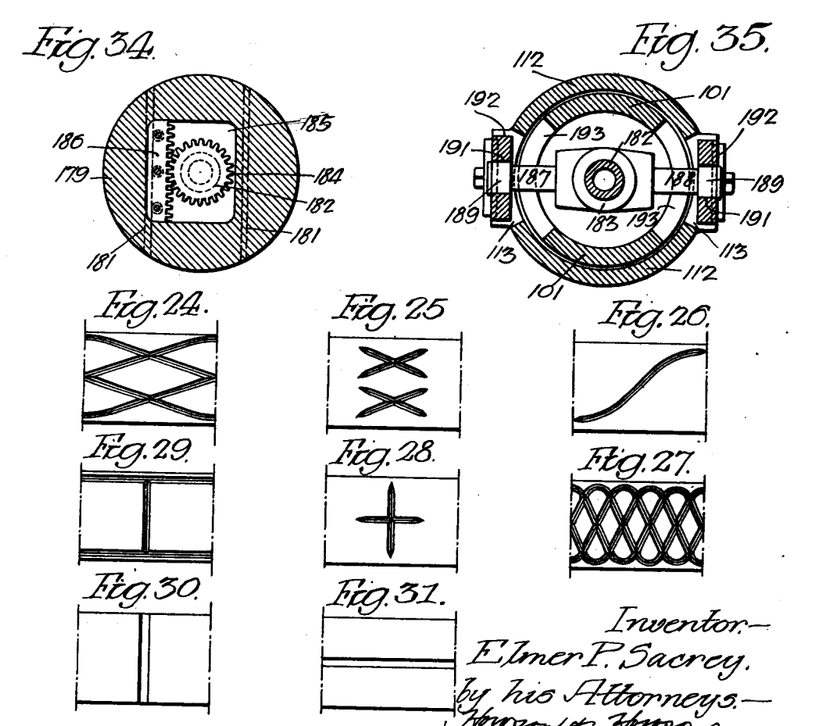
Figs. 24 to 31, inclusive, are, respectively, views similar to Figs. 22 and 23, illustrating other forms of grooves which may be formed by my machine.
Figs. 34 and 35 are sectional views taken on the lines 34—34 and 35—35, Fig. 32.
Figure 32:
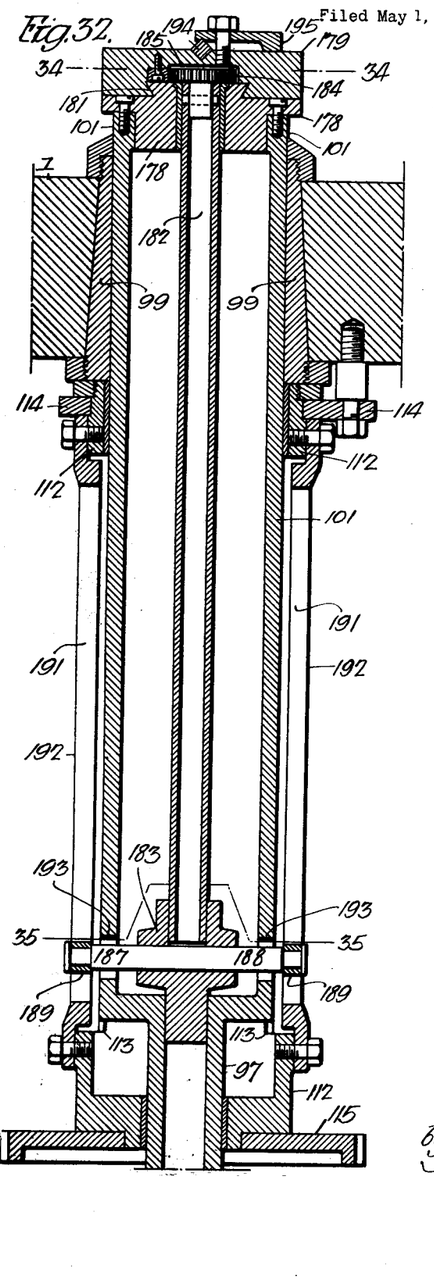
Figs. 32 and 33 are, respectively, sectional and side elevations of a modified form of certain details of the invention.
Figure 33:
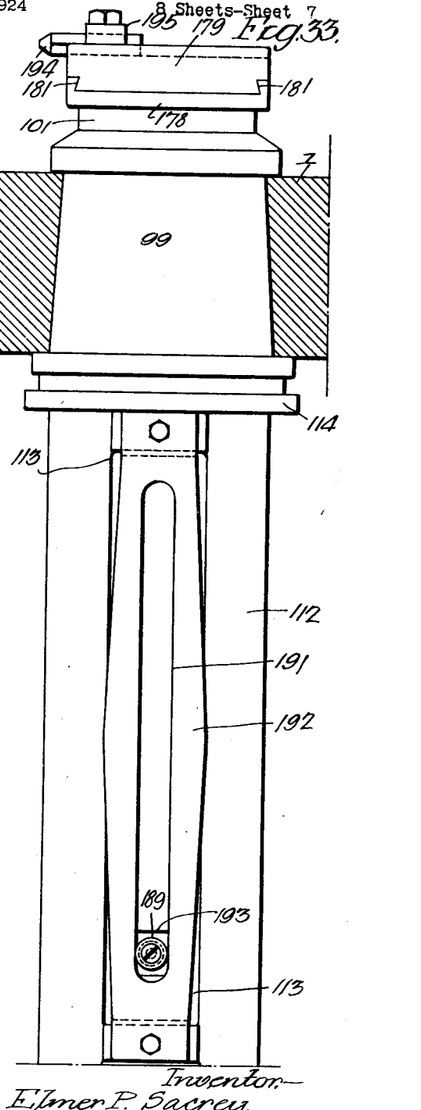

As clearly shown in Fig. 4, the lower section 25 of the shaft 21 carries, loosely mounted thereon, a gear 44, the latter being supported on a collar 45 secured to the shaft by a set screw 46. Secured to the gear 44 and depending therefrom is a sleeve 47 shown in perspective in Fig. 18, the interior surface of which sleeve is provided with a series of spiral teeth 48. Splined to the shaft below the gear 44 is a second sleeve 49 shown in perspective in Fig. 19, which is adapted to telescope with the sleeve 47 and which is provided on its outer face and at the top of the sleeve with a series of spirally arranged teeth 51 adapted to mesh with the teeth 48 of the sleeve 47. The sleeve 49 is also provided below the teeth 51 with a pair of flanges 52, 52, forming between them a circumferential recess into which extends the extremities of a forked arm 53 of a sleeve 54 slidably supported upon a vertical rod 55, which latter is mounted in a lug 56 of the frame 1. As best shown in Fig. 9, the sleeve 54 is provided with teeth 57 constituting a rack which meshes with the teeth of a segmental gear 58 on a lever 59 loosely mounted on a countershaft 61 journaled in a suitable bearing 60 on the frame, the outer end of the shaft being provided with an operating lever 62, as shown in Figs. 4, 7 and 10.

Operative connection is made between the lever 59 and the shaft 61 through a spring 63, (see Figure 21), one end of which is secured by a bolt 64 to the said lever, while the other end hooks around a pin 65 set in a recess in the end of the shaft 61, and secured therein by a screw 66. Relative movement between the lever and the shaft is limited by this pin 65, which is adapted to be engaged by shoulders 67 and 68 on the hub of the lever, as clearly shown in Figs. 20 and 21.

As indicated in Fig. 9, the tension of the spring 63 may be adjusted by changing the position of the securing bolt 64 in the lever, a number of tapped apertures 69 being provided in the lever for that purpose.

With the described construction, it will be apparent that movement of the lever 62 will rock the shaft 61, and through the spring 63 will also rock the lever 59, thereby elevating or lowering the sleeve 54 and with it the sleeve 49.

One arm of the lever 59 is provided with a roller 71 which rides upon the surface of a cam 72 carried by a countershaft 73 journaled in suitable bearings 74 in the frame 1. The shaft 73 receives a rotary motion through a spiral gear 75 which meshes with a spiral pinion 76 upon a vertical shaft 77 suitably journaled and supported in the main frame. This shaft 77 carries at the top a gear 78 which meshes with a gear 79 on the top of the shaft 21. The cam 72 is keyed to the countershaft 73 and is secured to the shaft by a nut 81, and a cover plate 82 is provided in the casing opposite that end of the shaft 73 to which the cam is secured, the removal of which affords free access to the cam and permits its removal and the substitution therefor of other cams.

The shaft 77 similar to the shaft 21 is divided and comprises upper and lower sections 83 and 84 which are connected by a clutch 85 similar in all respects to the clutch 27 and comprising an operating lever 86 which may be similar to the lever 34 of the clutch 27 and which may in similar manner be locked in alternate positions engaging and disengaging the clutch.

It will be noted by reference to Fig. 10 that adjustable means is provided for limiting the extent of movement of the lever 62, this means consisting in the present instance of an arm 87 at the base of said lever which projects outwardly between two bolts 88 and 89 adjustable in a slot 91 on the side of the casing. As illustrated in Fig. 10, the bolt 88 in the present instance stops the lever 87 in the neutral position, while the bolt 89 constitutes a stop for the extreme operative position of the lever, and as hereinafter described controls the depth of cut.

A spring pressed pin 90 is carried by the arm 87 and constitutes with a toothed element 92 a ratchet detent which while permitting advancement of the lever into the operative positions normally prevents return until the said pin is manually withdrawn from the teeth. This device, as hereinafter described, is useful in the cutting of interrupted grooves. The element 92, which is attached to the frame or casing by a bolt 93, is detachable, and in reversed position presents to the tapered end of the pin 90 a single comparatively deep and V-shaped notch 94, see Figs. 12 and 13, which tends to retain the lever in a neutral or inoperative position. While tending to retain the lever, the notch 94 because of its shape does not prevent movement of the lever from the neutral position in either direction. The notch 94 is useful, as hereinafter described, in cutting certain forms of continuous grooves. By a 90° turn of the pin 90 after withdrawal from the positions shown in Figs. 11 and 13, the said pin may be retained in the retracted and inoperative position.

Figures 5, 17, 18, 19, 22, 23:
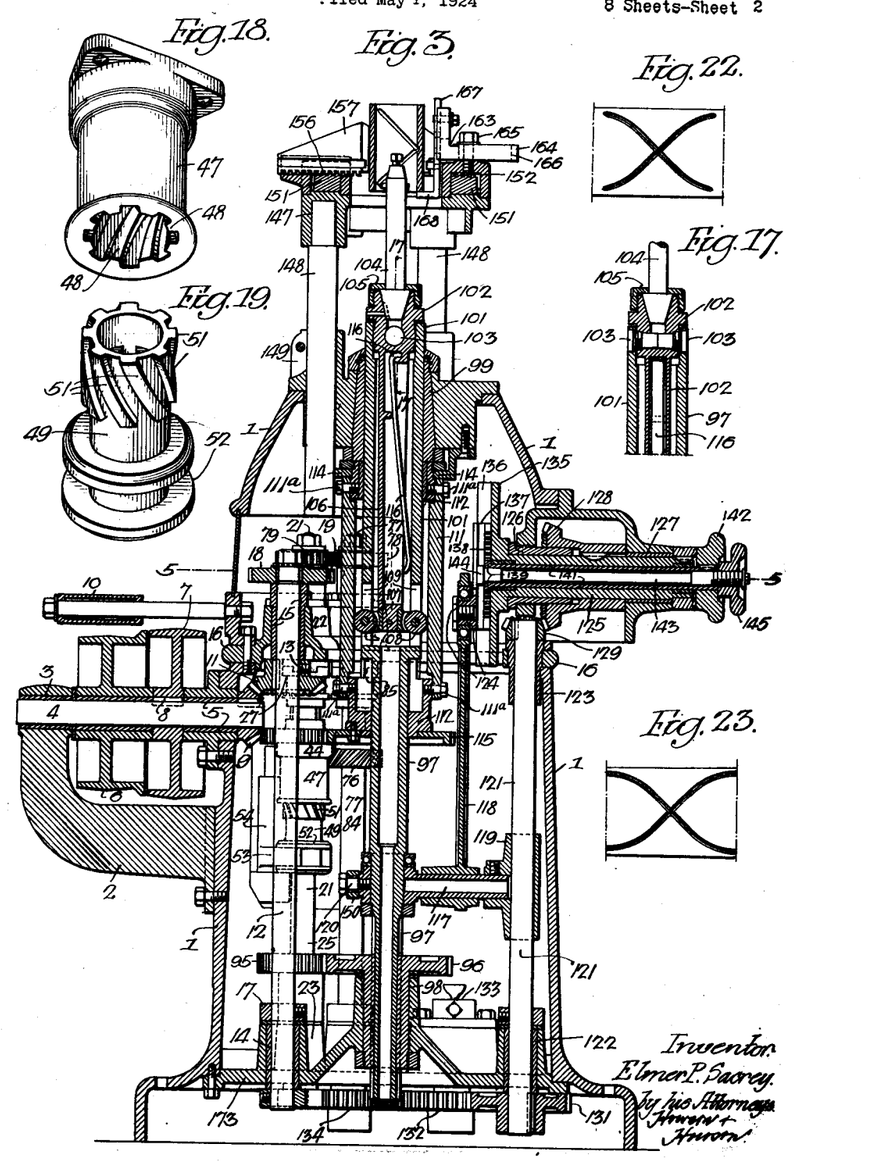
Fig. 5 is a section on the line 5—5, Fig. 3.
Fig. 17 is a fragmentary section on the line 17—17, Fig. 3.
Figs. 18 and 19 are, respectively, detached perspectives of the telescoping tool control elements.
Fig. 22 is a development of the interior of a bearing illustrating one type of groove (the interrupted figure eight) which may be formed by my machine.
Fig. 23 is a like view illustrating the same general form of groove, except that it is made with a continuous cut.
Figure 5:
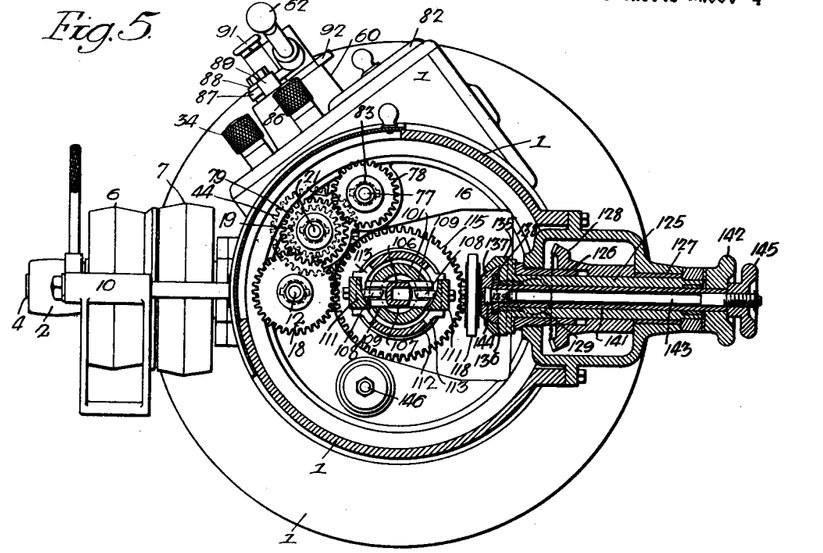

The shaft 21 carries, in addition to the gear 44 and at the bottom of the shaft, a gear 95 in the present instance of the same size as the gear 44, said gear 95 meshing with a gear 96 splined to a shaft 97 vertically supported in bearings 98 at the bottom, and 99 at the top of the frame. The upper end of the shaft 97 which I have designated in the present instance by the reference numeral 101 is enlarged and is hollow, and in the interior of this hollow portion 101 is pivotally mounted a tool carrier 102. This carrier, as best shown in Fig. 17, is pivotally mounted upon trunnions 103 formed in the present instance by screws threaded into the said carrier 102, the heads of the screws, constituting the trunnions proper, being journaled in suitable recesses in the hollow portion 101 of the shaft 97. The tool carrier 102 comprises at the top a chuck into which the tool holder 104 is secured by means of a nut 105, see Fig. 3, and said carrier also comprises a depending arm 106 which extends down through the hollow shaft section 101 and carries at the bottom a head 107 having at opposite sides rollers 108 which project through openings 109 in the side of the hollow shaft section 101 and engage cams 111, 111, the latter being carried by a hollow sleeve 112, which embraces the shaft 97 and the hollow section 101 of the latter, and being also provided with suitable side apertures 113 through which the said rollers 108 have access to the cams 111 which are secured by means of bolts 111ª or the like in said openings 113, all as clearly shown in Figs. 3 and 5.

The sleeve 112 is suspended from the top of the casing by a supporting ring 114, and said sleeve carries at its lower end a gear 115 which meshes with the gear 44 on the shaft 21. The gear 115 is of the same size in the present instance as the gear 96 on the shaft 97. A spring 116 is secured to the tool carrier 102, and by bearing against the side of the hollow shaft section 101, as shown in Fig. 3, prevents excessive free movement of the carrier about its pivot. The above described arrangement of elements is such that the sleeve 112 is adapted to rotate with the shaft 97, while at the same time being capable of angular movement with respect to the said shaft 97.

Loosely mounted on the shaft 97 but adapted to move with the shaft in its axial movement is an arm 117 which constitutes a journal pin for a connecting rod 118. The outer end of the arm 117 carries a cross head 119 which reciprocates upon a shaft 121 suitably supported in the frame in bearings 122 and 123. The connecting rod 118 connects the rod 117 with a crank pin 124 on the end of a shaft 125 journaled in bearings 126 and 127 in the casing. The shaft 125 receives its rotary movement through a bevel gear 128 which is keyed to the said shaft and which meshes with a pinion 129 at the top of the shaft 121. The shaft 121 carries at its lower end a gear 131 which meshes with a gear 132 on a short idler shaft 133 journaled in the bottom of the casing. The gear 132 meshes with a gear 134 keyed to the lower end of the shaft 77 whereby the shaft 121 is operatively connected through the intervening mechanism with the pulley shaft 4.

The shaft 125 has a head 135 at its inner end, and the said head, as clearly shown in Fig. 5, is provided with a guide slot 136 having mitred edges. Slidable in this slot 136 is a member 137 which carries the crank pin 124, and this element carries in one side of a recess in its back surface a rack 138. Also fitting into the said recess and meshing with the rack is a pinion 139 on the end of a hollow shaft 141 which extends through the shaft 125 and has keyed to the outer projecting end thereof a nut 142. A bolt 143 extends through the hollow shaft 141 and is provided with a beveled rectangular head 144 established in a corresponding recess in the upper split end of the member 137. The outer end of the bolt 143 carries a nut 145 by means of which the bolt may be tightened whereby the upper divided parts of the member 137 are spread apart and forced tightly against the mitred faces of the slot in the head 135 whereby the member 137 is locked tightly in the desired position in the said head.

It will be apparent that by loosening the nut 145, the nut 142 may be turned to shift the member 137 up in the slot 136 through the pinion on the end of the shaft 141 and the rack 138 on the said member. By thus adjusting the crank pin 124 with respect to the center line of the shaft 125, the throw of the vertical reciprocatory movement of the shaft 97 may be varied. The weight of the shaft 97 and associated moving parts is counterbalanced in the present instance by a spring 146, see Fig. 4, adjustably secured at one end to the frame and at the other end to an arm 150 pivotally connected at 120 to the arm 117 and also to a link 130 pivotally secured at its lower end to the frame.

Adjustably carried at the top of the frame 1 is a chuck or work-holder 147, the chuck in the present instance being supported upon three perpendicular rods 148 which are releasably supported by the clamps 149, 149. The chuck comprises a ring 151 shown in plan in Fig. 15, which rests within a recess 152 in the head and has in its periphery a plurality of tapped holes 153 for the reception of a handle 154, this handle extending through a slot 155 in the wall of the chuck.

Figures 1, 2, 14, 15, 16:
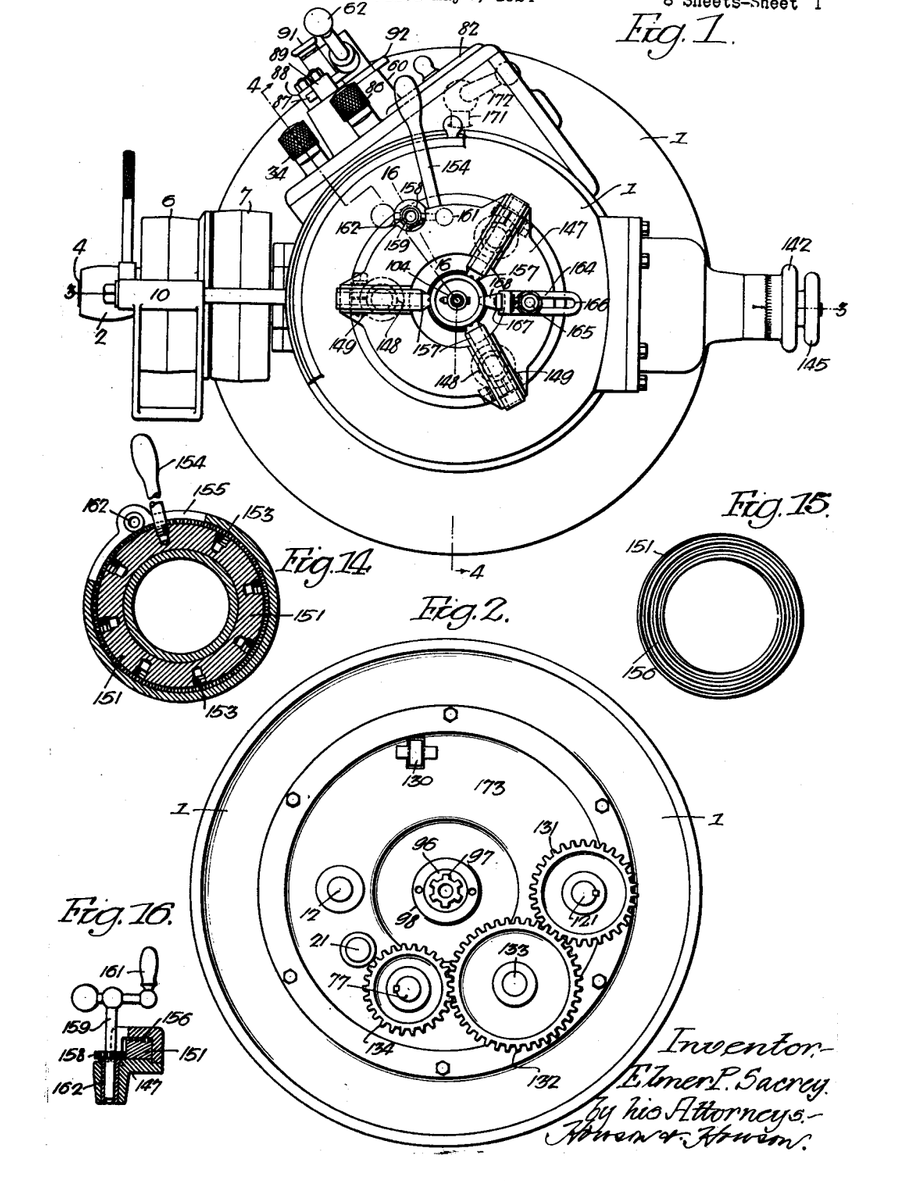
Figure 1 is a plan view of a machine made in accordance with my invention.
Fig. 2 is an inverted plan view of the machine.
Fig. 14 is a section on the line 14—14, Fig. 4.
Fig. 15 is a plan view of one of the chuck elements.
Fig. 16 is a fragmentary section on the line 16—16, Fig. 1.

Slidably mounted above the ring 151 and provided with teeth which mesh with the spiral ridge 156 of the ring 151 shown in Fig. 15, are three jaws 157 which, when the ring 156 is turned, are fed inwardly towards each other or away, depending upon the direction of rotation. The jaws 157 are adapted to grip the work and to center it over the shaft 97 in a vertical position, as shown in Figs. 1 and 3. The periphery of the ring 151 is also provided with teeth, and these teeth are adapted to mesh with a pinion 158 on a stem 159, which latter has a crank handle 161 at its top and is adapted to be fitted within a bearing opening 162 in the head shown in Figs. 1 and 16. By means of this crank, the ring 151 may be rotated at will to feed the jaws 157 in and out for adjusting the chuck to receive pieces of work of various sizes. The chuck also comprises an adjustable work support 163 which comprises a body piece 164 which is secured to the chuck head by means of a bolt 165, which latter passes through a slot 166 in the said body whereby the latter may be adjusted towards and from the work. The support further comprises an arm 167 which is slidable vertically upon the face of the body piece 164 and which is provided with a foot 168 adapted to support the work, as shown in Fig. 3. The chuck is adapted for speed operation in engaging and disengaging successive pieces of work of a uniform size by reason of the fact that after the jaws have been adjusted by means of the crank 158—161 to grip the first of said successive pieces of work, the latter may be rapidly released by means of the handle 154, and may be as rapidly returned by the same handle to grip a new piece of work after it has been inserted. It is merely necessary to drop the work between the jaws, it being supported in proper position by means of the work support 164—168.

The operation of the machine in so far as described is as follows: The work being mounted in the chuck in the aforedescribed manner, power is applied through the pulley 7 and the shaft 4. By reason of the connection between the shaft 4 and the shaft 12, the shaft 12 is rotated and with it the shaft 21 with the intermeshing of the gears 18 and 19. When the clutch 27 is engaged, the entire shaft 21 is rotated, the gear 95 on this shaft driving the gear 96 on the shaft 97, which rotates the latter. At the same time, the gear 44 which is driven through the elements 49 and 47 from the shaft 21, rotates through the gear 115 the cam sleeve 112, and the gears are so arranged that normally the sleeve 112 will rotate at exactly the same rate of speed as the shaft 97. By pulling over the lever 62, the member 49 is elevated, with the result that the angular relation between the gear 44 and the shaft 21 is changed, this having the effect also of altering the normal angular relation between the shaft 97 and the sleeve 112. This has the effect through the cams 111 of rocking the tool carrier 102 on its pivot, with the result that the tool is brought against the surface of the work. In the meantime, power from the shaft 4 is applied through the intermediate mechanism to the shaft 121, which by rotating the shaft 125 effects a vertical reciprocation of the shaft 97, which causes the tool to traverse the work in a reciprocatory movement. Obviously the general form of the groove is governed by the gearing controlling the rotational and longitudinal velocities of the tool.

Only where interrupted grooves are desired is the cam 72 employed. With the tool normally retained through the lever 62 in the operative or cutting position, this cam acts to periodically lower the member 49 and to thereby rock the tool free from the work. During the cutting, in this manner, of an interrupted groove, the lever 62 is retained continuously in the operatve position, and the movement of the tool independent of the lever is provided for by the spring 63 forming a flexible connection between the shaft 61 and the lever. Obviousy the cam 72 may be replaced by other cams to vary the character of the interruption. In the absence of the cam 72 or its alternate, the grooves, unless interrupted manually through manipulation of the operating lever, will be continuous.

By means of the rotary movement of the tool and its reciprocatory movement, and by reason of the cam 72 which automatically retracts the tool from the work, practically any form or nature of groove may be formed. Figures 22 to 31, inclusive, are illustrative of some of the types of grooves which may be formed with this machine.

By disengaging the clutch 27 and by tightening the clamp shown in Fig. 8, it is possible to obtain a longitudinal groove in the work, which groove may be continuous, or interrupted to any extent desired by use of a cam 72 of suitable form. The aforesaid clamp consists of a stem 171 having a suitable crank or handle 172 at its outer end and threaded into the opening in the base plate 173 of the casing. The inner end of the stem 171 bears against a block 174, which by engagement with the hub of the gear 96 is adapted to retain the latter immovable. This, however, does not interfere with the axial reciprocation of the shaft 97, and the fact that the lower part 25 of the shaft 21, through the gear 95, is held fixed, makes it possible through the telescoping members 47 and 49 to retract the tool from the work at will in the manner previously described.

Where the circumferential groove is desired, this may be accomplished by disengaging the clutch 85 which throws the reciprocating mechanism out of operation. In this instance, the rotation of the shaft 97 is accomplished as previously described. If it is desired to obtain an interrupted groove of this type, it is necessary to shift the crank pin 124 until it is concentric with the shaft 125, to leave the clutch 85 in engagement, and to adjust the member 167 of the chuck so that the work will assume a position to receive the cut at the desired point. While this prevents the reciprocation of the shaft 97, it still makes possible the intermittent engagement and disengagement of the tool with the work.

A particularly valuable feature of the invention resides in the ability for continuous operation of the machine without stopping the cutter spindle while changing the pieces of work. It is also desirable, for production, to set the chuck jaws so that their tops extend to a point substantially adjacent the upper end of the tool travel in reciprocating, whereby the work inserted in the chuck may be centered before the tool can contact with the new pieces of work, due to the cutter spindle having been axially aligned with the shaft 101, before removing the finished piece of work, thus rotating around and reciprocating longitudinally on the center of rotation of said shaft, which keeps the cutter point moving in a radius less than the inner diameter of the new piece of work. The jaws of the chuck are moved to an extent just permitting release of the work. The amount of movement of the chuck jaws is limited by the length of the slot 155 in which the chuck handle 154 operates. Thus the work engaging faces of the jaws are held to receive a new piece of work to a circle slightly greater than the outer diameter of the new piece of work which, when inserted between the jaws, can not be moved to a point sufficiently eccentric with respect to the circular path traversed by the point of the cutter to contact with said point. The chuck handle 154 is then moved to lock the work in the chuck, and the operating handle 62 subsequently moves to effect contact of the cutter point with the new piece of work.

During the cutting of an interrupted groove, the action of the cam 72 has a tendency to effect the operating lever 62, making it difficult for an operator to maintain an even pressure during the cutting operation. This is avoided by the aforedescribed ratchet device 90—92, which holds the lever in the position to which it has been advanced at the time the cam operates. Where double grooves are required, a double pointed tool may be used and the lever 62 forced from a neutral position, as indicated by the notch 94, successively in opposite directions.

In Figs. 32 to 35, inclusive, I have illustrated a modification in the mechanism adapted particularly for the grooving of large work. In the modification, the principle of operation is essentially the same as in the embodiment previously described, but in the present instance, instead of mounting the tool in a pivoted holder, the tool is carried by a member slidably supported at the top of the tool spindle which receives its lateral motion through a rack and pinion. In the drawings, I have illustrated only those parts of the machine in which the changes occur, and the parts have been indicated by the same reference numerals employed to designate the corresponding parts of the previously described embodiment.

In this case, as previously, the tool spindle or shaft 97 extends up through the cam sleeve 112 and comprises the upper enlarged portion 101, which carries at the top a head 178 forming a support for the tool holder 179, the latter being held to the head by a dovetailed guide 181 which fits within a corresponding transverse recess in the under side of said holder. Journaled in the head 178 concentric with the shaft 97 and free to rotate with respect thereto is an inner shaft 182 secured at the bottom in a member 183 journaled in the shaft 97. The shaft 182 carries at the top a pinion 184 which lies within a suitable recess 185 in the under side of the holder 179 and meshing with a rack 186 secured to the holder and occupying one side of said recess. The member 183 has extending therefrom arms 187 and 188 having on their extremities rollers 189 which travel in slots 191 in guide elements 192 corresponding to the cams 111 in the previously described embodiment and rotated in the same manner through the gear 115 carried by the sleeve 112. Openings 193, 193, provide passage for the arms 187 and 188 through the shaft part 101.

The tool holder 179 is provided with a V-shaped recess for reception of the tool 194, and a clamp 195 holds the tool in place.

In this instance, relative rotational movement between the guides 192 and the spindle 97 is obtained by the same mechanism as previously described, such relative movement resulting in a corresponding rotation of the pinion 184 with respect to the holder 179 and a consequent lateral movement of the holder on the head 178.

The application of this device to the machine will be readily understood.

Figure 36:
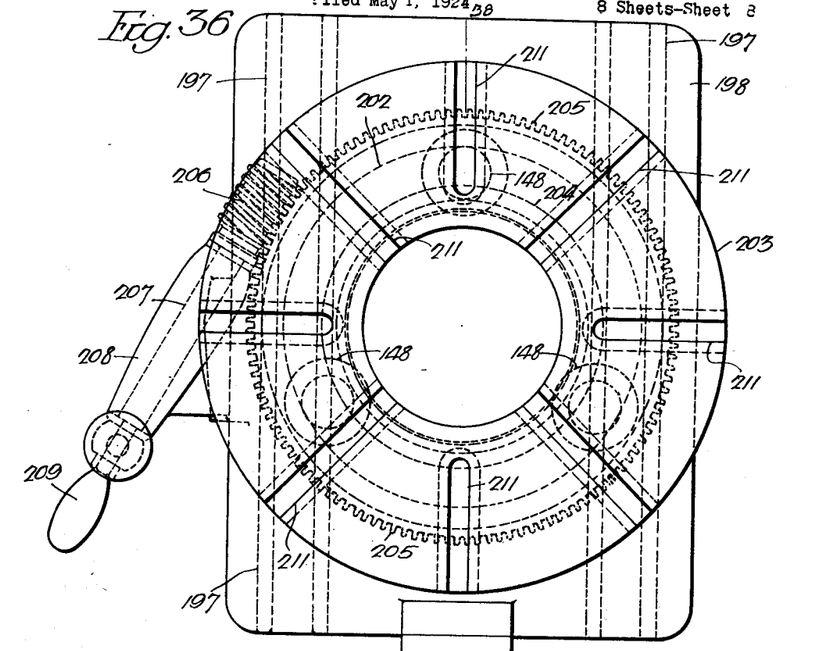
Fig. 36 is a plan view of the die slotting attachment.
Figure 37:
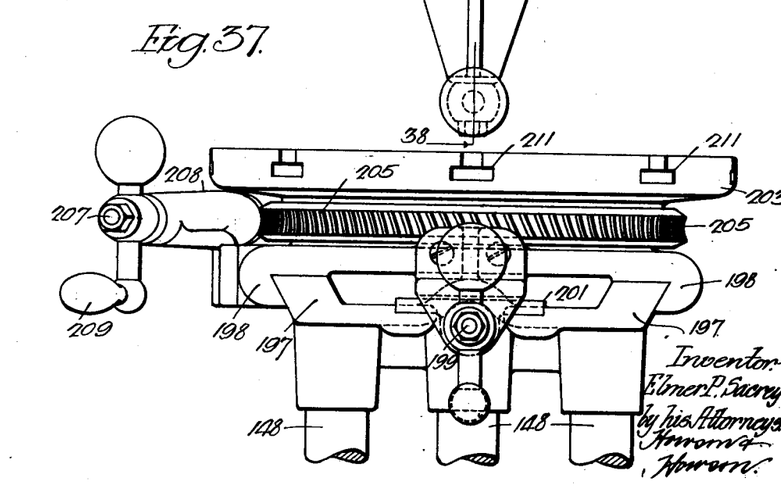
Fig. 37 is an elevation of the die slotting attachment and the upper end of the machine to which the attachment is applied.
Figure 38:
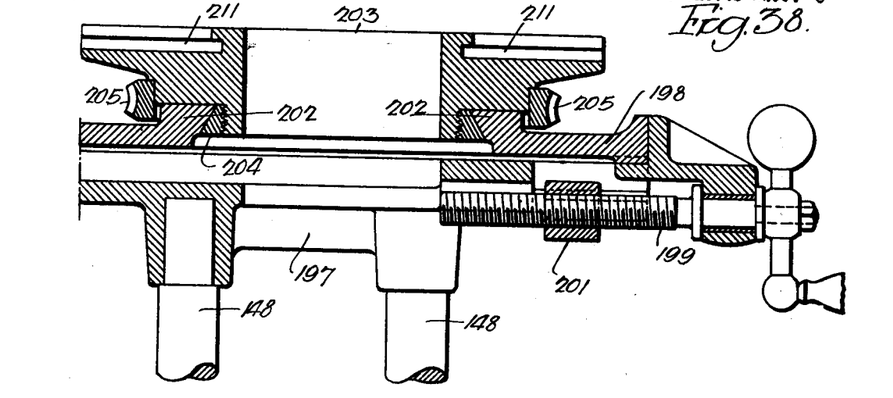
Fig. 38 is a section on the line 38—38, Fig. 36.

The machine is also adapted for die slotting and keyway cutting, and for this purpose, I may replace the chuck at the top of the machine by a specially formed holder illustrated in Figs. 36, 37 and 38. This holder consists of a head 197 which is supported at the tops of the support rods 148. The head 197 slidably supports a carrier 198, and this carrier through a feed screw 199, which is mounted in the carrier and which engages a threaded portion 201 of the body 197, is adapted to be advanced and is held in any desired position on the said head. The carrier comprises a ring-shaped member 202 in which is set a rotary head 203, the latter being retained in the ring 202 by means of a beveled nut 204 screwed to the under side of the head and engaging the beveled inner edges of the ring 202, as clearly shown in Fig. 38. This construction while holding the head 203 to the ring 202 permits free rotation of the head, and for this purpose I provide on the latter a worm wheel 205 which meshes with a worm 206 on the end of a shaft 207 suitably journaled in a bearing 208 and having at its outer end a crank or handle 209. By rotation of the shaft 208, the head 203 may be rotated at will upon its support. The head 203, as clearly illustrated, is provided with T-slots 211 for reception of T-headed bolts by means of which the work may be secured to the head. In the slotting work, the machine parts operate and function in exactly the same manner as previously described. In a great majority of keyway cutting operations, the regular three-jawed chuck may be used to advantage.

I claim:

1. The combination with an axially reciprocatory shaft, of a tool carrier pivoted on said shaft, cam means engaging the carrier and capable of angular movement relative to the latter to rock the carrier on said pivot, a power shaft, and mechanism connecting the power shaft both to the reciprocating shaft and to the cam means and comprising telescoping transmission elements adapted to vary the angular relation between the power shaft and the cam means.

2. The combination with a hollow shaft, of a tool-carrying element pivotally mounted in said hollow shaft and having an extension occupying the interior of said shaft, a laterally projecting head on said extension, said shaft having diametrically opposite openings through which the opposite ends of said head project, cam means closely engaging both projecting ends of said head, and mechanism for effecting a relative rotation between the cam means and the shaft to adjust the position of the tool carrier about its pivot.

3. The combination with a hollow shaft, of a member pivotally mounted in one end of said shaft and having an extension occupying the interior of the shaft, a head on said extension, said shaft having apertures through which the opposite ends of said head project, and opposite cams engaging the projecting ends of said head, said cams being adapted by rotational movement with respect to the shaft to positively shift the said pivoted member about its axis in either direction.

4. The combination with a rotary hollow shaft, of a tool carrier pivotally mounted in said shaft and having an extension occupying the interior of the shaft, a head on said extension, said shaft having apertures through which the opposite ends of said head are adapted to project, rollers on the said projecting ends, a structure adapted for relative rotation with respect to the shaft, and a set of cams carried by said structure and adapted to continuously engage the respective rollers whereby said relative rotational movement of the shaft and the cam-carrying structure is adapted to rock the tool carrier around its pivot in either direction depending on the direction of said relative rotation.

5. The combination with a drive shaft, of a driven shaft, a gear loose on said driven shaft operatively connected with the driving shaft, telescoping members respectively connected to said gear and splined to the shaft and constituting an operative and variable connection between the gear and the said driven shaft, and mechanism for reciprocating one of said telescoping members axially with respect to the other including a counter shaft, a cam detachably mounted on said countershaft, and elements interconnecting the cam and the said reciprocating member.

6. The combination with a driving shaft, of a driven shaft, a gear loose on said driven shaft operatively connected with the driving shaft, telescoping members respectively connected to the gear and splined to the shaft and constituting a driving connection between the gear and the shaft, means for reciprocating one of said members with respect to the other to vary the angular relation between the gear and the shaft including a countershaft, a member mounted on the shaft and operatively connected with said movable telescoping member, a flexible connection between said member and the countershaft, a second countershaft, and a cam detachably secured to said latter shaft and adapted to engage the said member resiliently mounted on the said first countershaft.

7. In a machine, the combination with tool-carrying devices, of mechanism for operating upon the said devices to advance the tool to an operative position including a hand lever, an intermediate member operatively connected with said hand lever and said devices, a cam operative independent of said handle and adapted to operate upon said devices through said intermediate member to retract the tool from the operative position intermittently, a resilient coupling between said hand lever and said intermediate member, and pawl and ratchet means operatively associated with said hand lever for preventing movement of the hand lever when the cam is in operation.

ELMER P. SACREY.